(12) United States Patent
Grimaud

(10) Patent No.: US 11,631,989 B2
(45) Date of Patent: Apr. 18, 2023

(54) INDUCTIVE HOLDING CIRCUIT

(71) Applicant: SAFRAN ELECTRONICS & DEFENSE, Paris (FR)

(72) Inventor: Louis Grimaud, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/639,802

(22) PCT Filed: Sep. 3, 2020

(86) PCT No.: PCT/FR2020/051531
§ 371 (c)(1),
(2) Date: Mar. 2, 2022

(87) PCT Pub. No.: WO2021/044104
PCT Pub. Date: Mar. 11, 2021

(65) Prior Publication Data
US 2022/0294257 A1 Sep. 15, 2022

(30) Foreign Application Priority Data

Sep. 3, 2019 (FR) ...................................... 1909666

(51) Int. Cl.
*H02J 9/06* (2006.01)
*B64D 41/00* (2006.01)
*H02H 3/24* (2006.01)

(52) U.S. Cl.
CPC ................ *H02J 9/06* (2013.01); *B64D 41/00* (2013.01); *H02H 3/24* (2013.01); *B64D 2221/00* (2013.01)

(58) Field of Classification Search
CPC ...... B64D 2221/00; B64D 41/00; H02H 3/24; H02J 9/06
(Continued)

(56) References Cited

U.S. PATENT DOCUMENTS 10,840,745 B1 * 11/2020 Maniktala ............. H02J 7/0077
10,938,315 B2 * 3/2021 Endo ....................... H02M 1/32
(Continued)

OTHER PUBLICATIONS

International Search Report for PCT/FR2020/051531 dated Jan. 11, 2021 (PCT/ISA/210).
(Continued)

*Primary Examiner* — Michael R. Fin
(74) *Attorney, Agent, or Firm* — Sughrue Mion, PLLC

(57) ABSTRACT

An electrical supply holding circuit includes a primary stage and a secondary stage. The primary stage includes a voltage connector connected to a supply network, and a primary winding connected to a voltage converter. The secondary stage includes a secondary winding facing the primary winding, the primary and secondary windings forming two coupled inductances, and a voltage controller to which the secondary winding is connected, the voltage controller being connected to a load and controlling a voltage across the terminals of the load. Directions of the currents flowing through the primary and secondary windings are the reverse of one another, and the voltage converter stops the supply to the primary winding when the supply voltage is less than a threshold voltage and resumes the supply to the primary winding when the supply voltage is greater than a threshold voltage.

10 Claims, 3 Drawing Sheets

(58) Field of Classification Search
USPC .................................................. 307/104, 9.1
See application file for complete search history.

(56) References Cited

U.S. PATENT DOCUMENTS

| | | |
|---|---|---|
| 2004/0156217 A1 | 8/2004 | Phadke |
| 2008/0278973 A1 | 11/2008 | Lin et al. |
| 2014/0119059 A1 | 5/2014 | Mao |
| 2019/0089199 A1* | 3/2019 | Hosotani ................. H02J 50/10 |
| 2019/0165685 A1 | 5/2019 | Lind et al. |
| 2020/0014243 A1* | 1/2020 | Kim ........................ H01F 38/14 |
| 2021/0218282 A1* | 7/2021 | Ettes ....................... H02J 50/40 |
| 2021/0234366 A1* | 7/2021 | Danilovic ................ H02H 7/20 |

OTHER PUBLICATIONS

Writen Opinion of the International Searching Authority for PCT/FR2020/051531 dated Jan. 11, 2021 (PCT/ISA/237).
French Search Report for 1909666 dated Apr. 9, 2020.

* cited by examiner

INDUCTIVE HOLDING CIRCUIT

CROSS REFERENCE TO RELATED APPLICATIONS

This application is a National Stage of International Application No. PCT/FR2020/051531 filed Sep. 3, 2020, claiming priority based on French Patent Application No. 1909666 filed Sep. 3, 2019, the entire contents of each of which being herein incorporated by reference in their entireties.

TECHNICAL FIELD

This invention relates to the field of embedded electronics in an aircraft, and more precisely to an electrical supply holding circuit for an electronic control unit.

An electronic control unit embedded in an aircraft is supplied with electricity by a network of the aircraft, for example with 28 volts DC or 115 volts AC. This network is shared with other equipment items, which connect dynamically to the network or use the network discontinuously. The network thus frequently exhibits sags, i.e. abrupt voltage drops of short duration (for example less than 10 ms on a DC network and less than 50 ms on an AC network). These sags occur frequently, typically every 1 to 10 seconds.

Since an electronic control unit is a sensitive member for the security of an aircraft, and liable to be negatively affected by sags, it is necessary to ensure the continuity of the electrical supply of the electronic control unit, in particular for an electronic control unit used to control an engine. An embedded electronic control unit is therefore generally associated with a supply holding circuit used to palliate sags such that its sags are transparent for the electronic control unit.

The solution conventionally adopted for the holding circuit uses high-capacitance capacitors allowing sufficient storage of energy to supplement the voltage drops of the network during sags. The capacitors used are for example capacitors of electrolytic aluminum type or tantalus type. When a sag occurs, the capacitors are connected in order to discharge over a voltage bus powering the electronic control unit.

This currently used solution does however have several drawbacks. Firstly, it is an expensive solution due to the need to have capacitors of high capacitance, in particular when capacitors made of tantalum gel are used. Moreover, this solution has large overall dimensions, particularly with capacitors of aluminum electrolytic type. The capacitors require the installation of specific control electronics to face the many constraints related to the use of the capacitors (altitude, electrical storage, charging current etc.) Furthermore, the presence of the capacitors leads to a complexity of the interface with the power supply of the electronic control unit which requires command and monitoring members which can degrade the electrical characteristics of the power supply and its reliability. In an embedded system, the intensities of the available charging currents are bounded, which can lead to significant charging times even though sags can be brought closer together in time. In addition, capacitors are components subject to ageing, which requires any degradation to be monitored and regular replacements to be made, complicating maintenance. Finally, the capacitors acting as an energy reserve are generally placed on the supply network, and it is therefore not possible to specifically select the holding of the supply solely to the loads for which it is necessary to maintain the voltage. This results in a significant loss of energy, since inessential loads see their supply held, causing an overdimensioning of the capacitors and mediocre performances in terms of holding the supply to critical loads.

OVERVIEW OF THE INVENTION

The invention aims to make it possible to selectively maintain the electrical supply of an embedded electronic control unit even in the event of sags in the electrical supply network by means of a simple and reliable circuit, inexpensive, of small overall dimensions and requiring less maintenance by comparison with the electrical supply holding circuits using high-capacitance capacitors.

For this purpose, the invention makes provision for an electrical supply holding circuit for a load supplied via a main converter from a supply network having a supply voltage, said electrical supply holding circuit comprising a primary stage and a secondary stage, the primary stage comprising:
- a voltage connector connected to the supply network, and
- a primary winding connected to the voltage converter and configured to be supplied by the voltage converter, the secondary stage comprising:
- a secondary winding facing the primary winding such that the primary winding and the secondary winding form two coupled inductances,
- a voltage controller to which the secondary winding is connected, the voltage controller being connected to the load and being configured to control a voltage across the terminals of the load, the holding circuit being configured such that the directions of the currents flowing through the primary winding and through the secondary winding are the reverse of one another, and the voltage converter is configured to stop the supply to the primary winding when the supply voltage is less than a threshold voltage and to resume the supply to the primary winding when the supply voltage is greater than a threshold voltage.

Unlike electrical supply holding circuits of the prior art which store energy in capacitive form, the electrical supply holding circuit stores the energy inductively in the windings (i.e. coils) of coupled inductances. This results in a more responsive, less burdensome, less bulky holding circuit which is less subject to ageing, since windings are more robust than capacitors.

The invention is advantageously completed by the following different features taken alone or in their different possible combinations:
- the voltage converter takes as input a measurement of the primary voltage across the terminals of the primary winding and a measurement of the primary current flowing through the primary winding, the voltage converter being configured to control the voltage across the terminals of the primary winding and the primary current flowing through the primary winding;
- the voltage converter is a switching converter configured to control gates of two series transistors as a function of the primary voltage measurement and of the current measurement;
- the voltage converter takes into account a measurement of the supply voltage;
- the voltage controller is a hysteresis controller;
- the voltage controller comprises a comparator configured to compare a voltage across the terminals of the load with a reference load voltage;

the voltage controller is configured to command a gate of a control transistor as a function of a comparison result, the control transistor being mounted in parallel with the secondary winding;

the secondary stage comprises a first diode between the secondary winding and a terminal of the control transistor, and a second diode between the terminal of the control transistor and the load.

The invention also relates to a method for holding the electrical supply of a load supplied via a main converter by a supply network having a supply voltage, the load being moreover connected to the supply network by way of an electrical supply holding circuit according to the invention, wherein:

when the supply voltage is greater than an undervoltage threshold, the voltage converter supplies the primary winding, the flow of current through the secondary winding being blocked, and when the supply voltage is less than an undervoltage threshold, the voltage converter stops the supply of the primary winding in which the current flow is blocked, and the voltage controller controls the electrical supply to the load by the secondary winding.

OVERVIEW OF THE FIGURES

Other features, aims and advantages of the invention will become apparent from the following description, which is purely illustrative and non-limiting, and which must be read with reference to the appended drawings wherein.

DETAILED DESCRIPTION

Figure 1:
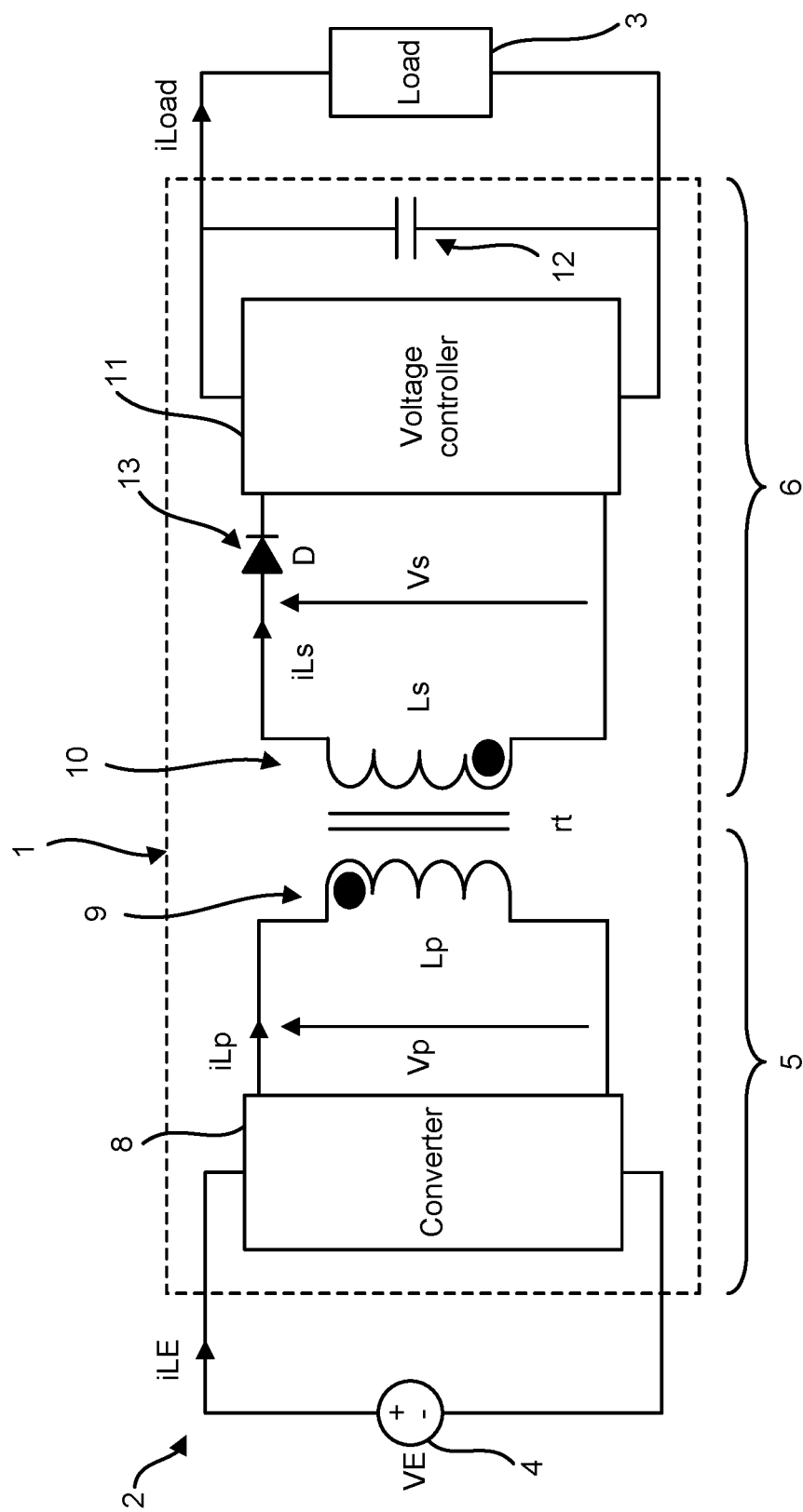
FIG. 1 is a simplified wiring diagram of a circuit according to a possible embodiment of the invention.

With reference to FIG. 1, the supply holding circuit 1 is disposed between the supply network 2 and the load 3. The supply network 1 is shown by a voltage source 4 delivering a supply voltage VE at its terminals to which the electrical supply holding circuit 1 is connected. A current of amperage iLE flows through the connection between the supply network 2 and the electrical supply holding circuit 1. The load 3 is here represented by an impedance Zload. A current of amperage iLoad flows through the connection between the electrical supply holding circuit 1 and the load 3.

The electrical supply holding circuit 1 is configured to maintain the electrical supply of the load 3 when the electrical supply of the load 3 by the supply network 1 exhibits a sag. More precisely, the electrical supply holding circuit 1 is configured to maintain across the terminals of the load 3 a voltage higher than the supply voltage VE when the supply voltage VE becomes lower than an undervoltage threshold UVD.

The electrical supply holding circuit 1 comprises a primary stage 5 and a secondary stage 6, the primary stage 5 being electrically connected to the supply network 2, and the secondary stage 6 being electrically connected to the load 3.

The primary stage 5 comprises:
a voltage converter 8 connected to the supply network 2, and
a primary winding 9 connected to the voltage converter 8 and configured to be supplied with power by the voltage converter 8.

The voltage converter 8 is configured to stop the supply to the primary winding 9 when the supply voltage VE is less than an undervoltage threshold UVD and to resume the electrical supply to the primary winding 9 when the supply voltage VE is greater than an undervoltage UVD. For this purpose, the voltage converter 8 may take into account a measurement of the supply voltage VE across the terminals of the supply network 2.

More generally, the voltage converter 8 is configured to control the voltage across the terminals of the primary winding 9. For this purpose, the voltage converter 8 may take as input a measurement of the primary voltage across the terminals of the primary winding 9 and a measurement of the primary current iLp flowing through the primary winding 9. The control of the intensity of the primary current iLp flowing through the primary winding 9 directly corresponds to the control of the inductive energy stored in the primary winding 9. The control of the primary voltage across the terminals of the primary winding 9 also makes it possible to control the dynamic (i.e. the variation) of the primary current iLp, which directly affects the trade-off between the storage speed of the inductive energy stored in the primary winding 9 and on the power drawn by the voltage converter 8 over the supply network 2.

The secondary stage 6 comprises a secondary winding 10 facing the primary winding 9 such that the primary winding 9 and the secondary winding 10 form two coupled inductances, with a transformation ratio rt corresponding to the ratio of the secondary inductance Ls of the secondary winding 10 to the primary inductance Lp of the primary winding 9. The transformation ratio rt is typically of 1, but can where applicable be chosen different to 1. The values of the primary inductance Lp and the secondary inductance Ls are chosen as a function of the energy one wishes to store, and therefore as a function of the electrical power consumption of the load 3. For example, to store 1 joule of energy, i.e. 100 W during 10 ms or 5 W for 200 ms, it is possible to choose for each winding 8 inductances of 10 pH, for overall dimensions of only 320 cm$^2$ by 4.5 cm, and therefore much smaller than the high-capacitance capacitors of the prior art. A secondary voltage Vs is present across the terminals of the secondary winding 10.

The secondary stage 6 also comprises a voltage controller 11 to which the secondary winding 10 is connected, the voltage controller 11 being connected to the load 3 and being configured to control a voltage across the terminals of the load 3. Preferably, the voltage controller is a hysteresis controller.

The direction of flow of the currents in the primary winding 9 and in the secondary winding 10 are imposed, and opposite one another, as indicated on the figure by the opposite positions of the points on the windings 10, 9, unlike a transformer. The primary current iLp (of positive amperage iLp) flowing from the voltage converter 8 through the primary winding 9 is imposed by the voltage converter 8. The primary current iLp can typically be a setpoint for the voltage converter 8.

A first diode 13 (denoted D) between the secondary winding 10 and the voltage controller 11 can be used to impose the direction of the secondary current iLs (of positive amperage iLs) flowing from the secondary winding 10 all the way to the voltage controller 11.

The secondary stage 6 can also comprise a capacitor 12 connected to the voltage controller 11 parallel to the load 3. The capacitor 12, of capacitance Cs, of the secondary stage 6 makes it possible to uncouple 3 the load with respect to the voltage controller 11, and also performs a function of filtering high-frequency interference.

The electrical supply holding circuit 1 has the function of holding the electrical supply of the load 3 despite the occurrence of sags. In the absence of sags, the holding circuit of the electrical supply 1 is in a phase of controlled charging of the primary winding 9. The supply voltage VE is at a nominal value, for example 28 volts DC, greater than an undervoltage threshold UVD. The undervoltage threshold UVD is preferably between 5% and 50% of the supply voltage VE, and preferably between 10% and 25%. The undervoltage threshold UVD is typically less than 10 V.

The voltage converter 8 imposes the primary current iLp through the primary winding 9, imposing the primary voltage Vp across the terminals of the primary winding 9 and the energy stored in this primary winding 9. In the charging phase, following a sag, the primary voltage Vp particularly depends on the needs of the load 3 and the conditions of the supply network 2. In the stable regime, i.e. in the absence of sags, and when enough inductive energy has been stored in the primary winding 9, the flow of the primary current iLp through the primary winding 9 is held to offset the losses.

The flow of the current through the secondary winding 10 is blocked, because of the imposed direction of flow and the coupling of the windings 9, 10. The load 3 is supplied by the supply network 2 via a main converter, mainly through a converter with galvanic insulation.

Figure 3:
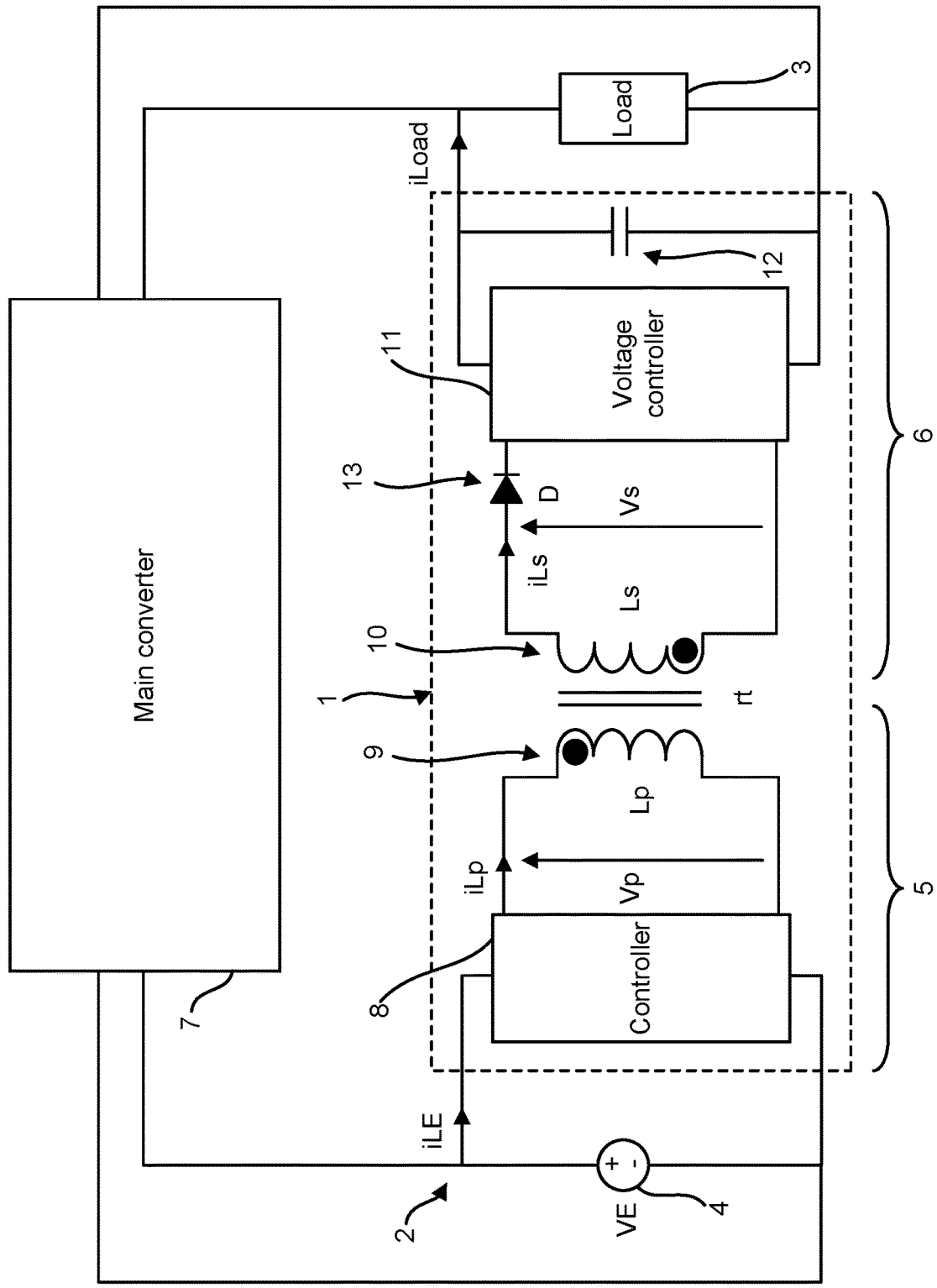
FIG. 3 is another wiring diagram showing the details of a possible embodiment of the invention.

The main converter can be part of a main supply 7 (represented in FIG. 3). The main supply is connected in parallel to the inductive energy reserve circuit and operates when the network Ve is functional (in the absence of sags). This main supply can use any type of insulated switching converter.

During this phase of controlled charging of the primary winding 9, energy is stored in the primary winding 9 in the form of inductive energy. Once enough inductive energy has been stored in the primary winding 9, and if there are no sags, the circuit is in the stable regime. Via the coupling of the inductors, the inductive energy stored in the primary winding 9 will be transferred into the secondary winding 10 in the following phase.

This phase of controlled charging of the primary winding 9 and the subsequent stable regime 9 also lasts as long as there are no sags, and therefore typically lasts more than 1 second, preferably more than 2 seconds, and still preferably more than 3 seconds. As indicated above, the voltage Vp across the terminals of the primary winding 9 goes to zero during this controlled charging phase, in order to offset the natural losses. The losses are of resistive type, magnetic (iron losses, AC losses). These losses can be modeled by a resistance Rloss in series with the primary winding 9. In the absence of any voltage sufficient to offset these losses, the primary winding 9 of inductance Lp discharges with a dynamic curve gradient of Lp/Rloss. The primary voltage Vp to be applied in the permanent regime is therefore Rloss×iLp. A low primary voltage Vp is then sufficient, the primary voltage Vp then being preferably less than 2 volts, and still preferably less than 1 volt.

When a sag occurs, the supply voltage VE of the supply network 2 falls below the undervoltage threshold UVD. The supply holding circuit 1 then enters a phase of controlled discharging of the secondary winding 10. The voltage converter 8 then stops the flow of the current through the primary iLp in the primary winding 9. On the other hand, the secondary current iLs flows through the secondary winding 10, in the direction imposed by the first diode 13. It is the voltage controller 11 which controls with a regulation by Proportional-Integral (PI) controller or by hysteresis, the voltage across the terminals of the load 3.

The energy which was stored in the secondary winding 10 during the previous charging phase is then used to supply the load 3 with electricity, thus making it possible to hold the electrical supply to the load 3 despite the sag.

This phase of controlled discharging of the secondary winding 10 lasts as long as energy is stored and the supply voltage VE has not gone back above a threshold voltage, which can be the same as the undervoltage threshold UVD used to enter the phase of controlled discharging of the secondary winding 10, or which may be different therefrom. When the supply voltage VE goes back above the threshold voltage, the holding circuit 1 then enters the phase of controlled charging of the primary winding 9, and the load 3 is once again supplied by the supply network 2 via the main converter 7. If all the stored energy is consumed in the secondary before the voltage of the supply network 2 has gone back up, then the secondary current IIs will become zero and the secondary voltage falls to 0 V. The time during which the phase of controlled discharging can be held therefore depends on the load. It is however recalled that the holding circuit 1 has the purpose of palliating only the sags of the supply network 2. Thus, the phase of controlled discharging of the secondary winding 10 typically lasts less than 100 ms, and preferably less than 60 ms, or even less than 20 ms in DC.

When the holding circuit 1 goes back into the phase of controlled charging of the primary winding 9, the voltage converter 8 controls the primary current iLp flowing through the primary winding 9 with a trade-off between the limitation of the primary current iLp and the speed of recharging.

Figure 2:
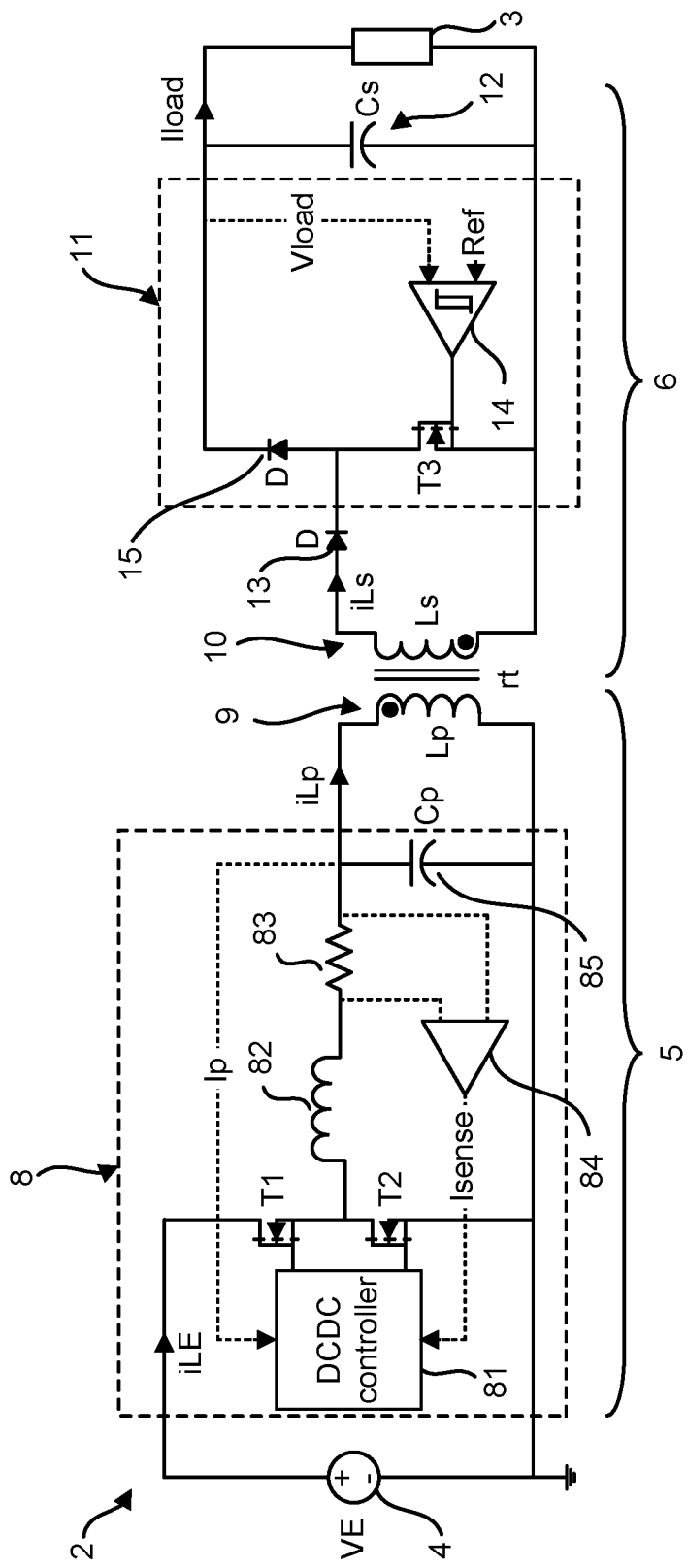
FIG. 2 is a wiring diagram showing the details of a possible embodiment of the invention.

With reference to FIG. 2 there will now follow a more detailed description of a non-limiting example of a possible embodiment, acting as a complement to the embodiment described with reference to FIG. 1. This embodiment is given by way of non-limiting illustration in the case of a DC supply network 2.

In this embodiment, the voltage converter 8 comprises a command member 81 connected by two channels dedicated to the gates of two transistors T1, T2 series-mounted between the terminals of the supply network 2. In the example of FIG. 2, these transistors T1, T2 are metal oxide gate field-effect transistors (better known as MOSFET) of N type, for example with doping. The drain of the first transistor T1 is connected to a supply network 2 terminal and the source of the first transistor T1 is connected to the drain of the second transistor T2, the source of which is connected to the other terminal of the supply network 2. Between the two transistors, i.e. at the level of the source of the first transistor T1 and of the drain of the second transistor T2 is connected an inductance 82 (or coil) with the aim of smoothing the current resulting from the cutting, and a resistance 83 series connected with the inductance 82 and with a terminal of the primary winding 9.

A voltage measurement is taken at each terminal of the resistance 83, and supplied to a comparator 84, which deduces therefrom a measurement Isense of the current flowing through the resistor 83, representing the primary current iLp flowing through the primary winding. A measurement of the primary voltage Vp across the terminals of the primary winding 9 is also recorded and supplied to the commanding member 81.

The control of the voltage across the terminals of the primary winding 9 and of the primary current flowing through the primary winding 9 by the voltage converter 8 is done by commanding the gates of the two transistors T1, T2 as a function of the primary voltage measurement and of the current measurement. The voltage converter 8 is here a switching converter. Other types of voltage converter—could be used as long as they make it possible to control the voltage across the terminals of the primary winding 9 and/or the amperage of the current flowing through the primary winding 9. A capacitor 85 (of a capacitance Cp) may be connected parallel to the primary winding 9 in order to filter the high-frequency fluctuations of the primary current iLp and of the primary voltage due to the action of the commanding member 8 on the transistors T1, T2. Furthermore, the commanding member 81 takes into account a measurement of the supply voltage VE, in order to detect its passing below or above the undervoltage threshold UVD, and to consequently act on the transistors T1, T2.

In the secondary stage 6, the voltage controller 11 is a control transistor T3, one terminal of which is connected to the secondary winding 10 and the other terminal of which is connected to the first diode 13, which is series-connected with the secondary winding 10. In the example of FIG. 2, the control transistor T3 is a metal oxide gate field-effect transistor (better known as MOSFET) of N type, for example with doping. It is then the drain of the control transistor T3 which is connected to the cathode of the first diode 13, while it is the source of the control transistor T3 which is connected to the secondary winding 10.

The voltage controller 11 comprises a comparator 14 configured to compare a measurement Vload of the voltage across the terminals of the load 3 with a reference load voltage ref, and to command the gate of the control transistor T3 as a function of this comparison. It is the controller 14 that exhibits the hysteresis of the voltage controller 11. More precisely, the output of the comparator 14 commanding the gate of the control transistor T3 depends on the direction in which the measurement voltage Vload crosses the reference voltage Vref. The threshold constituted by the reference voltage Vref is thus modulated as a function of the value of the measurement voltage Vload. The comparator can for example be a Schmitt toggle or an operational amplifier.

At the cathode of the first diode 13 and at the drain of the control transistor T3 a second diode 15, denoted D, is connected between the terminal of the control transistor T3 and the load 3. The anode of the second diode 15 is therefore connected to the cathode of the first diode 13 and to the drain of the control transistor T3, and the cathode of the second diode 15 is connected to a terminal of the load 3 and to a terminal of the capacitor 12 connected in parallel with the load 3. The first diode 13 and the second diode 15 make it possible to ensure the direction of the current flowing not only through the secondary winding 10, but also through the control transistor T3.

The invention is not limited to the embodiment described and shown in the appended figures. Modifications remain possible, particularly from the point of view of the composition of the various technical features or by substitution of technical equivalents, without departing from the field of protection of the invention.

The invention claimed is:

1. An electrical supply holding circuit for a load supplied via a main converter from a supply network having a supply voltage, the load comprising an electronic control unit embedded in an aircraft, said electrical supply holding circuit comprising a primary stage and a secondary stage, the primary stage comprising:
    a voltage converter connected to the supply network of the aircraft, and
    a primary winding connected to the voltage converter and configured to be supplied by the voltage converter,
the secondary stage comprising:
    a secondary winding facing the primary winding such that the primary winding and the secondary winding form two coupled inductances,
    a voltage controller to which the secondary winding is connected, the voltage controller being connected to the load and being configured to control a voltage across terminals of the load,
    the electrical supply holding circuit being configured such that directions of currents flowing through the primary winding and through the secondary winding are the reverse of one another, and the voltage converter is configured to stop the supply to the primary winding when the supply voltage of the supply network of the aircraft is less than a threshold voltage, the voltage controller being configured to control the voltage across the terminals of the load to keep supplying the load with energy stored in the secondary winding, and
    the voltage converter is configured to resume the supply to the primary winding when the supply voltage of the supply network of the aircraft is greater than the threshold voltage, thereby supplying the load from the supply network through the primary and secondary windings.

2. The electrical supply holding circuit as claimed in claim 1, wherein the voltage converter takes as input a primary voltage measurement of a primary voltage across the terminals of the primary winding and a current measurement of a primary current flowing through the primary winding, the voltage converter being configured to control the voltage across the terminals of the primary winding and the primary current flowing through the primary winding.

3. The electrical supply holding circuit as claimed in claim 2, wherein the voltage converter is a switching converter configured to control gates of two series transistors as a function of the primary voltage measurement and of the current measurement.

4. The electrical supply holding circuit as claimed in claim 1, wherein the voltage converter takes into account a measurement of the supply voltage.

5. The electrical supply holding circuit as claimed in claim 1, wherein the voltage controller is a hysteresis controller.

6. The electrical supply holding circuit as claimed in claim 1, wherein the voltage controller comprises a comparator configured to compare the voltage across the terminals of the load with a reference load voltage.

7. The electrical supply holding circuit as claimed in claim 1, wherein the voltage controller is configured to command a gate of a control transistor as a function of a comparison result, the control transistor being mounted in parallel with the secondary winding.

8. The electrical supply holding circuit as claimed in claim 7, wherein the secondary stage comprises a first diode between the secondary winding and a terminal of the control transistor, and a second diode between the terminal of the control transistor and the load.

9. A method for holding an electrical supply of a load supplied via a main converter by a supply network having a supply voltage, the load being moreover connected to the supply network by way of an electrical supply holding circuit, the load comprising an electronic control unit embedded in an aircraft said electrical supply holding circuit comprising a primary stage and a secondary stage, the primary stage comprising:
- a voltage converter connected to the supply network of the aircraft, and
- a primary winding connected to the voltage converter and configured to be supplied by the voltage converter, the secondary stage comprising:
- a secondary winding facing the primary winding such that the primary winding and the secondary winding form two couples inductances, and
- a voltage controller to which the secondary winding is connected, the voltage controller being connected to the load and being configured to control a voltage across terminals of the load, the electrical supply holding circuit being configured such that directions of currents flowing through the primary winding and through the secondary winding are the reverse of one another, and the voltage converter is configured to stop the supply to the primary winding when the supply voltage of the supply network of the aircraft is less than a threshold voltage, the voltage controller being configured to control the voltage across the terminals of the load to keep supplying the load with energy stored in the secondary winding, and the voltage converter is configured to resume the supply to the primary winding when the supply voltage of the supply network of the aircraft is greater than the threshold voltage, thereby supplying the load from the supply network through the primary and secondary windings, wherein the method comprises:
when the supply voltage is greater than an undervoltage threshold, the voltage converter supplies the primary winding, a flow of current through the secondary winding being blocked, and
when the supply voltage is less than the undervoltage threshold, the voltage converter stops the supply of the primary winding in which the current flow is blocked, and the voltage controller controls the electrical supply to the load by the secondary winding.

10. An electrical supply holding circuit for a load supplied via a main converter from a supply network having a supply voltage, said electrical supply holding circuit comprising a primary stage and a secondary stage, the primary stage comprising:

a voltage converter connected to the supply network, and a primary winding connected to the voltage converter and configured to be supplied by the voltage converter, the secondary stage comprising:

a secondary winding facing the primary winding such that the primary winding and the secondary winding form two coupled inductances, a voltage controller to which the secondary winding is connected, the voltage controller being connected to the load and being configured to control a voltage across terminals of the load, the electrical supply holding circuit being configured such that directions of currents flowing through the primary winding and through the secondary winding are the reverse of one another, and the voltage converter is configured to stop the supply to the primary winding when the supply voltage is less than a threshold voltage and to resume the supply to the primary winding when the supply voltage is greater than the threshold voltage, wherein the voltage controller is configured to command a gate of a control transistor—as a function of a comparison result, the control transistor being mounted in parallel with the secondary winding, and wherein the secondary stage comprises a first diode between the secondary winding and a terminal of the control transistor, and a second diode between the terminal of the control transistor and the load.

* * * * *